United States Patent [19]

Upadhyay et al.

[11] Patent Number: 4,694,236

[45] Date of Patent: Sep. 15, 1987

[54] CONTROL FOR AC MOTOR DRIVE

[75] Inventors: Anand Upadhyay; Lawrence W. Messenger, both of Rockford, Ill.

[73] Assignee: Sundstrand Corporation, Rockford, Ill.

[21] Appl. No.: 705,665

[22] Filed: Feb. 26, 1985

[51] Int. Cl.[4] .............................................. H02P 5/40
[52] U.S. Cl. ..................................... 318/798; 318/806
[58] Field of Search ............... 318/798, 806, 812, 805, 318/139; 361/33; 180/65.8

[56] References Cited

U.S. PATENT DOCUMENTS

| | | | |
|---|---|---|---|
| 3,593,103 | 7/1971 | Chandler | 318/808 |
| 3,718,851 | 2/1973 | Graf et al. | 318/806 |
| 3,781,614 | 12/1973 | Mokrytzki et al. | 318/801 |
| 3,806,198 | 3/1974 | Graf et al. | 318/806 |
| 3,859,579 | 1/1975 | Plunkett | 318/805 |
| 3,875,483 | 4/1975 | Farr . | |
| 4,047,083 | 9/1977 | Plunkett . | |
| 4,300,086 | 11/1981 | Cesarz et al. . | |
| 4,316,132 | 2/1982 | Geppert | 318/811 |
| 4,532,464 | 7/1985 | Igarashi et al. | 318/798 |

OTHER PUBLICATIONS

Bose, B. K., "A Microprocessor Based Control System for a Near-Term Electric Vehicle" IEEE Trans. on Ind. App., vol. IA-17, No. 6, 11/12-1981.

Primary Examiner—David Smith, Jr.
Attorney, Agent, or Firm—Wood, Dalton, Phillips, Mason & Rowe

[57] ABSTRACT

Battery powered variable speed motor drives typically control the speed of the motor in accordance with a speed command. If the battery discharges to a point where the speed command is greater than that speed which can be supported by the battery voltage, the current drawn from the battery by the motor increases, thereby accelerating discharge of same. This problem is obviated by a control for an AC motor drive according to the present invention which includes means for deriving a signal from the output of the battery representing the maximum motor speed which the battery voltage can support, means for summing the maximum motor speed signal with the speed command signal to derive an error signal and means for summing the error signal with the speed command signal when the commanded speed is greater than that speed which can be supported by the battery voltage to reduce the speed command to the inverter and thereby maintain a predetermined voltage to frequency relationship in the inverter output.

9 Claims, 2 Drawing Figures

CONTROL FOR AC MOTOR DRIVE

DESCRIPTION

1. Technical Field

The present invention relates to controls for power converters and more particularly to a control for a variable speed AC motor drive.

2. Background Art

Variable frequency DC to AC inverters are commonly used as variable speed motor drives for controlling AC induction motors. A battery is used as the DC power supply to the inverter in many of these applications.

To produce constant motor output torque over a range of motor speeds, the inverter is operated by an inverter control to produce output power having a constant voltage to frequency (V/F) ratio. The output frequency of the inverter is controlled in accordance with a speed command input to the control. Control over the output voltage of the inverter is effected in most cases by the pulse width modulation or PWM technique, whereby the duty cycle of power transistors in the inverter determines the output amplitude of the AC voltage.

As the battery discharges, the output voltage thereof reduces. The PWM technique initially compensates for this reduction in battery voltage to maintain the constant V/F ratio by increasing the duty cycle of the power transistors. However, at a certain reduced battery voltage, the transistors must be operated at 100% duty cycle to maintain the desired relationship between output voltage and frequency. As the battery continues to discharge, the V/F ratio drops since the inverter voltage cannot be maintained at the necessary level.

As the V/F ratio decreases with battery voltage, the motor output torque also decreases. In order to maintain the commanded motor speed, the motor must draw higher current from the battery. An increase in motor current causes the battery to discharge at an even faster rate, thereby further reducing the battery voltage and compounding the problem.

In addition, a reduced V/F ratio reduces the motor flux level and increases motor slip. At a certain point, the torque required by the load may exceed the output torque capability of the motor at the reduced flux level. This can cause the drive system to become unstable or even stall.

SUMMARY OF THE INVENTION

In accordance with the present invention, a battery voltage speed limit control for a battery powered AC motor drive includes means for operating an inverter to produce an output having a predetermined voltage to frequency relationship so that the battery power is efficiently utilized.

In a first embodiment of the invention, a voltage signal representing the battery output voltage is subtracted from a speed command signal which controls the inverter frequency, and hence the speed of the motor. When the battery voltage is sufficient to support commanded motor speed, an inverter PWM control operates the inverter switches in either a PWM mode or a full on (or unmodulated) mode to maintain the V/F ratio of the inverter output at a constant level. However, when the voltage signal becomes less than the speed command signal, indicating that the commanded motor speed cannot be supported by the available battery voltage, the speed command signal is reduced to in turn reduce the inverter output frequency. In such a case, it is desirable to reduce the fundamental frequency of the inverter output rather than reenter the PWM mode. This maintains the V/F ratio constant and prevents an undesirable increase in motor current and a subsequent increase in the discharge rate of the battery.

In a second embodiment of the invention, a function generator modifies the speed command signal before the voltage signal is subtracted therefrom so that a different or variable V/F relationship is established, preferably as a function of battery discharge or to optimize any other suitable operating parameter.

BRIEF DESCRIPTION OF THE DRAWINGS

Other features and advantages of the invention will be apparent from the following description taken in connection with the drawings, wherein.

BEST MODE FOR CARRYING OUT THE INVENTION

Figure 1:
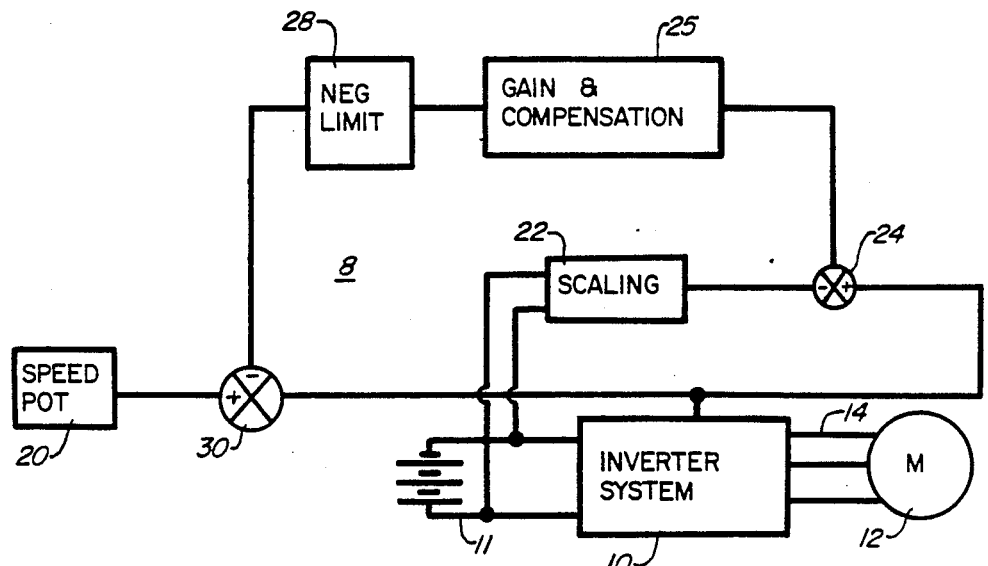
FIG. 1 is a block diagram of a control according to the present invention in conjunction with a variable speed AC motor drive.

Referring now to FIG. 1, there is illustrated a control 8 for controlling an AC motor drive comprising a variable frequency inverter system 10 which converts a DC voltage from a DC source such as a battery 11 into polyphase AC power for energizing a motor 12 over lines 14. The inverter system 10 includes an inverter output stage having switches which are operated by an inverter control. The inverter system 10 may be a conventional variable frequency system or may be of the type disclosed in Upadhyay et al, Ser. No. 705,662, filed Feb. 26, 1985 entitled "Inverter Control System" and assigned to the assignee of the instant application (Ser. No. 705,662 filed 2/26/85, the disclosure of which is hereby incorporated by reference.

The inverter system receives a speed command input from a potentiometer 20 which in turn controls the output frequency of the inverter system 10 and hence the speed of the motor 12. A pulse width modulated or PWM control in the inverter system controls the output voltage of the inverter to in turn maintain the voltage to frequency, or V/F ratio at a constant value.

The output of the battery 11 is coupled to a scaling network 22 which in turn develops a voltage signal representing the instantaneous DC output voltage of the battery 11. This voltage signal also represents the maximum motor speed which can be supported by the DC voltage of the battery.

In a first embodiment of the invention, a first summing junction 24 subtracts the voltage signal from the scaling network 22 from the speed command signal to generate an error signal which is proportional to the difference between the speed command signal and the maximum motor speed which can be attained for the voltage level produced by the battery 11.

The output of the summing junction 24 is coupled to a gain and compensation circuit 26 which may, for example, comprise a PID (or proportional plus integral plus differential) controller.

The gain and compensation circuit 26 is in turn connected to a negative limit circuit 28. This circuit comprises means for limiting the error signal to one polarity.

For example, this circuit may comprise a diode which clamps the output of the gain and compensation circuit 26 to ground potential when such output is below zero volts but which passes all signals at voltages greater than approximately zero volts.

The output of the negative limit circuit 28 is in turn coupled to an inverting input of a second summing junction 30 which comprises means for modifying the speed command signal in a manner described in greater detail below.

When the speed command signal is less than the voltage or maximum speed signal from the scaling network 22, the error signal generated by the first summing junction 24 is negative. The resulting negative voltage output of the gain and compensation circuit 26 is clamped to zero volts by the negative limit circuit 28. Thus, the voltage to the inverting input of the second summing junction 30 is zero and hence the speed command signal is not modified before application to the inverter system 10. In this instance, the battery voltage is sufficient to support the commanded motor speed and hence no corrective action is taken at this time.

However, when the speed command signal is greater than the voltage or maximum speed signal, the error signal generated by the summing junction 24 is positive. In this case, the battery voltage is now insufficient to support the commanded motor speed. This positive error signal is processed by the gain and compensation circuit 26 and is subtracted by the second summing junction 30 from the speed command signal from the potentiometer 20. The summing junction 30 thereby generates a modified speed command signal which reduces the commanded output frequency of the inverter system 10 to maintain the V/F ratio at the constant level.

Figure 2:
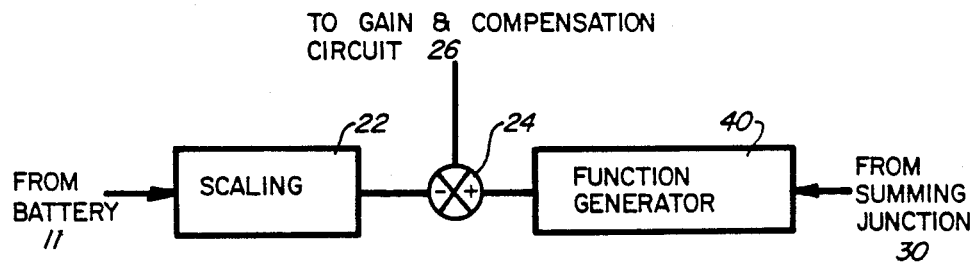
FIG. 2 illustrates a modification to the diagram of FIG. 1 for a second embodiment of the invention.

Referring now to FIG. 2, the circuitry of FIG. 1 may be modified by the addition of a function generator 40 coupled between the summing junctions 30 and 24 which modifies the speed command in accordance with a predetermined transfer function before the voltage signal is subtracted therefrom in the summing junction 24. The function generator 40 may be utilized to establish a predetermined relationship between inverter output voltage and frequency. This relationship preferably is one based on the discharge characteristics of the battery 11. Alternately, the relationship may be one which maximizes a desired operational parameter of the motor and/or inverter, such as length of running time, motor torque, or the like.

We claim:

1. In a variable-speed AC motor drive having a variable output frequency inverter operated by a pulse width modulation (PWM) control to convert DC power developed by a battery into AC output power for energizing a motor, the battery having a finite power reserve and developing a progressively diminishing output voltage as the battery discharges, the inverter output frequency being determined in accordance with an input speed command signal, a control to maintain continued energization of the AC motor by the inverter at a constant inverter output voltage to output frequency ratio as the output voltage of the battery progressively diminishes, the control comprising:
   means for deriving from the battery a signal representing the maximum motor speed which can be supported by the battery output voltage;
   means for summing said maximum motor speed signal with said speed command signal to derive an error signal; and
   means for summing an error signal indicating a maximum supportable motor speed less than the commanded speed with the speed command signal to reduce the speed command signal to the inverter.

2. The speed limit control of claim 1, further comprising means for compensating the error signal.

3. The speed limit control of claim 1, further comprising means for limiting the error signal to one polarity, thereby activating the control only when the speed command signal is greater than the maximum motor speed signal.

4. In a variable-speed AC motor drive having a variable output frequency inverter operated by a pulse width modulation (PWM) control to convert DC power developed by a battery into AC output power for energizing a motor, the battery having a finite power reserve and developing a progressively diminishing output voltage as the battery discharges, the inverter output frequency being determined in accordance with an input speed command signal, a control to maintain continued energization of the AC motor by the inverter at a constant inverter output voltage to output frequency ratio as the output voltage of the battery progressively diminishes, the control comprising:
   means for deriving from said battery a signal representing the maximum motor speed which can be supported by the battery output voltage;
   means for summing said maximum motor speed signal with said speed command signal to derive an error signal;
   means for compensating said error signal;
   means for limiting said compensated error signal to a single polarity; and,
   means for summing said compensated error signal indicating a maximum supportable motor speed less than said commanded speed with said the speed command signal to reduce said speed command to the inverter.

5. In a motor drive including a PWM inverter for converting a DC voltage into a variable-frequency AC output for energizing a load, the DC voltage developed by a battery having a finite energy reserve and developing a progressively diminishing output voltage as the battery discharges, the inverter output frequency being controlled in accordance with an input command, the improvement comprising:
   means for generating a voltage signal representing the DC voltage;
   means coupled to the generating means for summing the voltage signal with the input command to derive an error signal; and
   means coupled to the summing means for modifying the input command with the error signal to reduce the output frequency of the inverter when the DC voltage drops below a certain level to continuously maintain energization of the load at a predetermined inverter output voltage to output frequency relationship.

6. The improvement of claim 5, further including a negative limit circuit coupled between the summing means and the modifying means which prevents modification of the input command until the input command is greater than the voltage signal.

7. The improvement of claim 5, wherein the modifying means is a summing junction.

8. The improvement of claim 5, further including a function generator for modifying the input command before the input command is applied to the summing means.

9. In a variable-speed AC motor drive which is coupled to and receives power from a battery of finite energy reserve wherein the battery develops a progressively diminishing output voltage as the battery discharges, the motor drive including a DC to AC PWM inverter connected to said battery and having an AC output for energizing a motor and a source of motor speed command signal connected to the inverter to control the frequency of the inverter output, control for maintaining continuous energization of the motor at a constant inverter output frequency to output voltage ratio as the output voltage of the battery progressively diminishes, the control comprising:

means for deriving from said battery a signal representing the maximum motor speed which can be supported by the battery output voltage;

means for modifying said speed command signal;

means for summing said maximum motor speed signal with said modified speed command signal to derive an error signal; and means for summing the error signal indicating a maximum supportable motor speed less than the modified commanded speed with the speed command signal to reduce the speed command to the inverter.

* * * * *